(12) United States Patent
Chiu et al.

(10) Patent No.: US 8,312,505 B2
(45) Date of Patent: *Nov. 13, 2012

(54) ELECTRONIC CARD CONNECTOR, LEVEL-SHIFTING DEVICE AND DIGITAL TELEVISION RECEIVER

(75) Inventors: Pi-Chang Chiu, Taipei Hsien (TW); Kuo-Hua Chen, Taipei Hsien (TW)

(73) Assignee: Wistron Corporation, Hsichih, Taipei Hsien (TW)

( * ) Notice: Subject to any disclaimer, the term of this patent is extended or adjusted under 35 U.S.C. 154(b) by 359 days.

This patent is subject to a terminal disclaimer.

(21) Appl. No.: 12/648,935

(22) Filed: Dec. 29, 2009

(65) Prior Publication Data
US 2010/0165211 A1      Jul. 1, 2010

Related U.S. Application Data

(62) Division of application No. 12/435,839, filed on May 5, 2009, now Pat. No. 7,748,025.

(30) Foreign Application Priority Data

Oct. 17, 2008   (TW) .............................. 97139915 A

(51) Int. Cl.
*H04N 7/16*      (2011.01)
(52) U.S. Cl. ..................................................... 725/151
(58) Field of Classification Search .................. None
See application file for complete search history.

(56) References Cited

U.S. PATENT DOCUMENTS

| | | | |
|---|---|---|---|
| 5,450,365 A | 9/1995 | Adachi | |
| 5,490,117 A | 2/1996 | Oda et al. | |
| 5,627,416 A | 5/1997 | Kantner | |
| 5,773,901 A | 6/1998 | Kantner | |
| 5,953,417 A * | 9/1999 | Quan | 380/203 |
| 6,148,347 A | 11/2000 | Finch et al. | |
| 6,266,720 B1 | 7/2001 | Kakinoki | |
| 6,327,635 B1 | 12/2001 | Alston et al. | |
| 6,407,774 B1 * | 6/2002 | Mabuchi et al. | 348/335 |
| 6,711,004 B2 | 3/2004 | Yen et al. | |
| 6,753,758 B2 | 6/2004 | Colman | |
| 8,081,243 B2 * | 12/2011 | Chou | 348/294 |

(Continued)

OTHER PUBLICATIONS

Non-Final Office Action for U.S Appl. No. 12/648,925, mailed Dec. 27, 2010.

(Continued)

*Primary Examiner* — Brian Pendleton
*Assistant Examiner* — Ryan Stronczer
(74) *Attorney, Agent, or Firm* — Choate Hall & Stewart LLP

(57) ABSTRACT

An electronic card connector is used to connect an electronic card to an electronic device, such as a level-shifting device. The electronic card connector includes an insert slot unit and a switch unit. The insert slot unit is adapted for insertion of the electronic card and is provided with a power signal terminal for providing electric power to the electronic card that is inserted into the insert slot unit. The 10 switch unit is disposed in the insert slot unit, is operable to establish electrical connection between the power signal terminal and a first power source when the electronic card inserted into the insert slot unit does not actuate the switch unit, and is further operable to establish electrical connection between the power signal terminal and a second power source when the electronic card inserted into the insert slot unit actuates the switch unit.

7 Claims, 4 Drawing Sheets

U.S. PATENT DOCUMENTS

2002/0057019 A1    5/2002   Moran
2007/0132891 A1*   6/2007   Adachi .......................... 348/738
2008/0007122 A1    1/2008   Jablonski et al.
2009/0185082 A1*   7/2009   Hashimoto ................... 348/739
2009/0244335 A1*  10/2009   Chou ............................ 348/294

OTHER PUBLICATIONS

Office Action for TW 97139915, dated Sep. 21, 2011, and abridged English translation (7 pages).

* cited by examiner

ELECTRONIC CARD CONNECTOR, LEVEL-SHIFTING DEVICE AND DIGITAL TELEVISION RECEIVER

CROSS-REFERENCE TO RELATED APPLICATION

This application claims priority to and is a divisional of U.S. Non-provisional patent application Ser. No. 12/435,839, entitled "Electronic Card Connector, Level-Shifting Device and Digital Television Receiver", filed May 5, 2009, which claims priority to Taiwanese Application No. 097139915, filed on Oct. 17, 2008, all of which are incorporated herein by reference in their entirety.

BACKGROUND OF THE INVENTION

1. Field of the Invention

The present invention relates to a connector, more particularly to an electronic card connector.

2. Description of the Related Art

Nowadays, a digital television receiver is needed for watching digital television programs via a digital television or a computer. Further, watching programs on an encrypted pay-channel via the digital television receiver requires an electronic decoding device, commonly called a common interface (CI) decoding electronic card, disposed therein to decode a digital television signal of the encrypted pay-channel so as to watch the programs of the encrypted pay-channel.

The CI decoding electronic card is commonly inserted into a slot of an electronic card connector of the digital television receiver, is electrically connected to a relevant circuit of the digital television receiver via the electronic card connector, and receives a power signal therefrom. There are two different types of the CI decoding electronic cards that are configured to utilize +5V and +3.3V power signals, respectively. However, the digital television or computer is usually adapted to provide a predetermined power signal (+5V or +3.3V) to the electronic card connector. Therefore, a CI decoding electronic card 1 that is configured to utilize the +5V power signal, and a CI decoding electronic card 2 that is configured to utilize the +3.3V power signal are provided with different fool-proof notches 10, 20 as shown in FIGS. 1 and 2, respectively. Furthermore, the electronic card connectors are provided with corresponding fool-proof notches so as to protect the CI decoding electronic card 2 from burnout due to inadvertent insertion into an electronic card connector that provides the predetermined power signal of +5V, and to avoid an inoperable situation of the CI decoding electronic card 1 due to insertion into an electronic card connector that provides the predetermined +3.3V power signal.

However, consumers are usually unaware if the electronic card connector is adapted to provide the predetermined +5V or +3.3V power signal, such that the consumers may purchase a CI decoding electronic card that is configured to utilize a power signal different from the predetermined power signal provided by the electronic card connector, i.e., the CI decoding electronic card cannot be used with the electronic card connector. Therefore, the conventional electronic card connector is inconvenient for consumers, and still has room for improvement.

SUMMARY OF THE INVENTION

Therefore, an object of the present invention is to provide an electronic card connector that is adapted to provide different power signals to different electronic cards.

Accordingly, in some embodiments, an electronic card connector is adapted to electrically connect an electronic card with an electronic device that is used with a first power source and a second power source. The electronic card connector comprises: an insert slot unit adapted for insertion of the electronic card and provided with a power signal terminal for providing electric power to the electronic card that is inserted into the insert slot unit; and a switch unit disposed in the insert slot unit and adapted to be connected electrically to the first and second power sources. The switch unit is operable to establish electrical connection between the power signal terminal and the first power source when the electronic card inserted into the insert slot unit does not actuate the switch unit. The switch unit is further operable to establish electrical connection between the power signal terminal and the second power source when the electronic card inserted into the insert slot unit actuates the switch unit.

In some embodiments, the switch unit is not actuated when the electronic card inserted into the insert slot unit is one that is configured to utilize a power signal of the first power source, and the switch unit is actuated when the electronic card inserted into the insert slot unit is one that is configured to utilize a power signal of the second power source.

In some embodiments, the switch unit includes: a pushing component movably disposed in the insert slot unit; a spring member adapted to contact separably the first 10 power source and having one end pushed by the pushing component; a first diode adapted to connect the second power source with the power signal terminal in a forward bias condition; and a second diode connecting the spring member with the power signal terminal in the forward bias condition. The spring member electrically contacts the first power source so as to provide a power signal of the first power source to the power signal terminal through the second diode when the electronic card inserted into the insert slot unit does not cause the pushing component to move in the insert slot unit. The spring member is pushed by the pushing component to separate from the first power source so as to permit the power signal terminal to receive a power signal of the second power source through the first diode when the electronic card inserted into the insert slot unit causes the pushing component to move in the insert slot unit.

In some embodiments, the switch unit can be a combination of a pushing component movably disposed in the insert slot unit, and a switch component triggered by the pushing component. The switch component is electrically connected to the power signal terminal, and is adapted to be electrically connected to the first and second power sources. The switch component establishes the electrical connection between the power signal terminal and the first power source when the electronic card inserted into the insert slot unit does not cause the pushing component to move in the insert slot unit, and is triggered by the pushing component to establish the electrical connection between the power signal terminal and the second power source when the electronic card inserted into the insert slot unit causes the pushing component to move in the insert slot unit.

In some embodiments, when the electronic card is one that is configured to utilize the power signal of the first power source, the pushing component matches a fool-proof notch provided in the electronic card, such that the electronic card does not cause the pushing component to move in the insert slot unit when the electronic card is inserted into the insert slot unit. When the electronic card is one that is configured to utilize the power signal of the second power source, the pushing component does not match a fool-proof notch provided in the electronic card, such that the electronic card causes the pushing component to move in the insert slot unit when the electronic card is inserted into the insert slot unit.

Another object of the present invention is to provide a level-shifting device that is adapted to provide an appropriate power signal to an electronic card inserted into an electronic card connector thereof.

Accordingly, in some embodiments, a level-shifting device is adapted to electrically interconnect a tuner unit and a decoding unit of a digital television receiver. The level-shifting device comprises:

an electronic card connector adapted to be electrically connected to a first power source and a second power source, adapted for insertion of an electronic card, and operable to provide a power signal of one of the first and second power sources to the electronic card according to a requirement of the electronic card;

a first level-shifting unit adapted to be electrically connected between the tuner unit and the electronic card connector, adapted to receive a predetermined power signal, and operable for shifting a signal level of a digital television output signal of the tuner unit and for providing a level-shifted output to the electronic card via the electronic card connector when the power signal provided by the electronic card connector to the electronic card inserted therein does not match the predetermined power signal;

a second level-shifting unit adapted to be electrically connected between the decoding unit and the electronic card connector, adapted to receive the predetermined power signal, and operable for shifting a signal level of a digital television output signal of the electronic card from the electronic card connector and for providing a level-shifted output to the decoding unit when the power signal provided by the electronic card connector to the electronic card inserted therein does not match the predetermined power signal; and a third level-shifting unit adapted to be electrically connected between the decoding unit and the electronic card connector, adapted to receive the predetermined power signal, and operable for shifting a signal level of a control command exchanged between the electronic card and the decoding unit via the electronic card connector and the third level-shifting unit and for providing a level-shifted output to a destined one of the electronic card and the decoding unit via the electronic card connector when the power signal provided by the electronic card connector to the electronic card inserted therein does not match the predetermined power signal.

A further object of the present invention is to provide a digital television receiver that is adapted to provide an appropriate power signal to an electronic card inserted into an electronic card connector thereof.

Accordingly, in some embodiments, a digital television receiver is adapted for use with a first power source and a second power source and comprises a tuner unit adapted for receiving a digital television signal, a decoding unit for decompressing the digital television signal, and the aforementioned level-shifting device electrically interconnecting the tuner unit and the decoding unit.

In some embodiments, the pushing component of the switch unit is used to detect the fool-proof notch of the electronic card inserted into the insert slot unit so that the appropriate power signal that corresponds to the electronic card can be provided to the same. Therefore, a purpose of enable use of different electronic cards with the same digital television receiver of this invention can be achieved.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
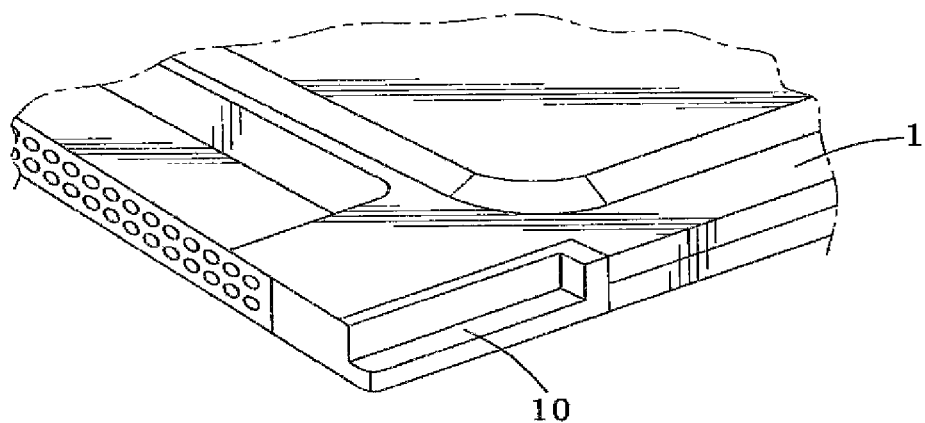
FIG. 1 is a schematic diagram showing a fool-proof notch of a conventional common interface (CI) electronic card that is configured to utilize a +5V power signal.
Figure 2:
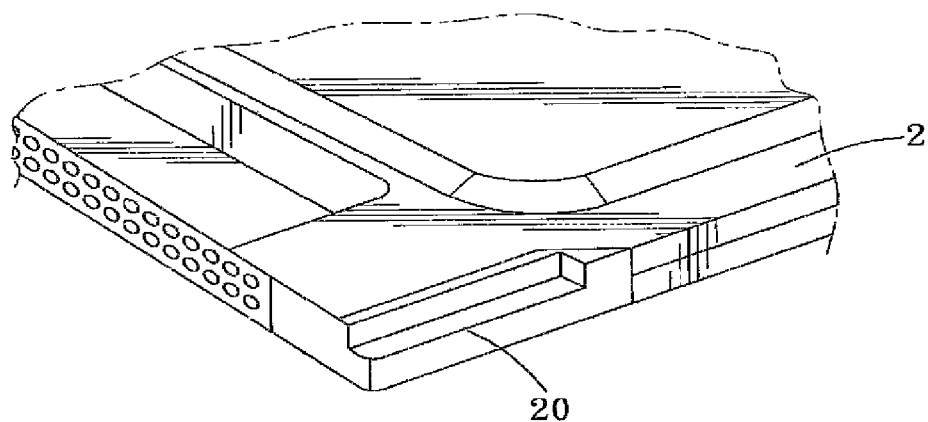
FIG. 2 is a schematic diagram showing a fool-proof notch of a conventional CI electronic card that is configured to utilize a +3.3V power signal.
Figure 3:
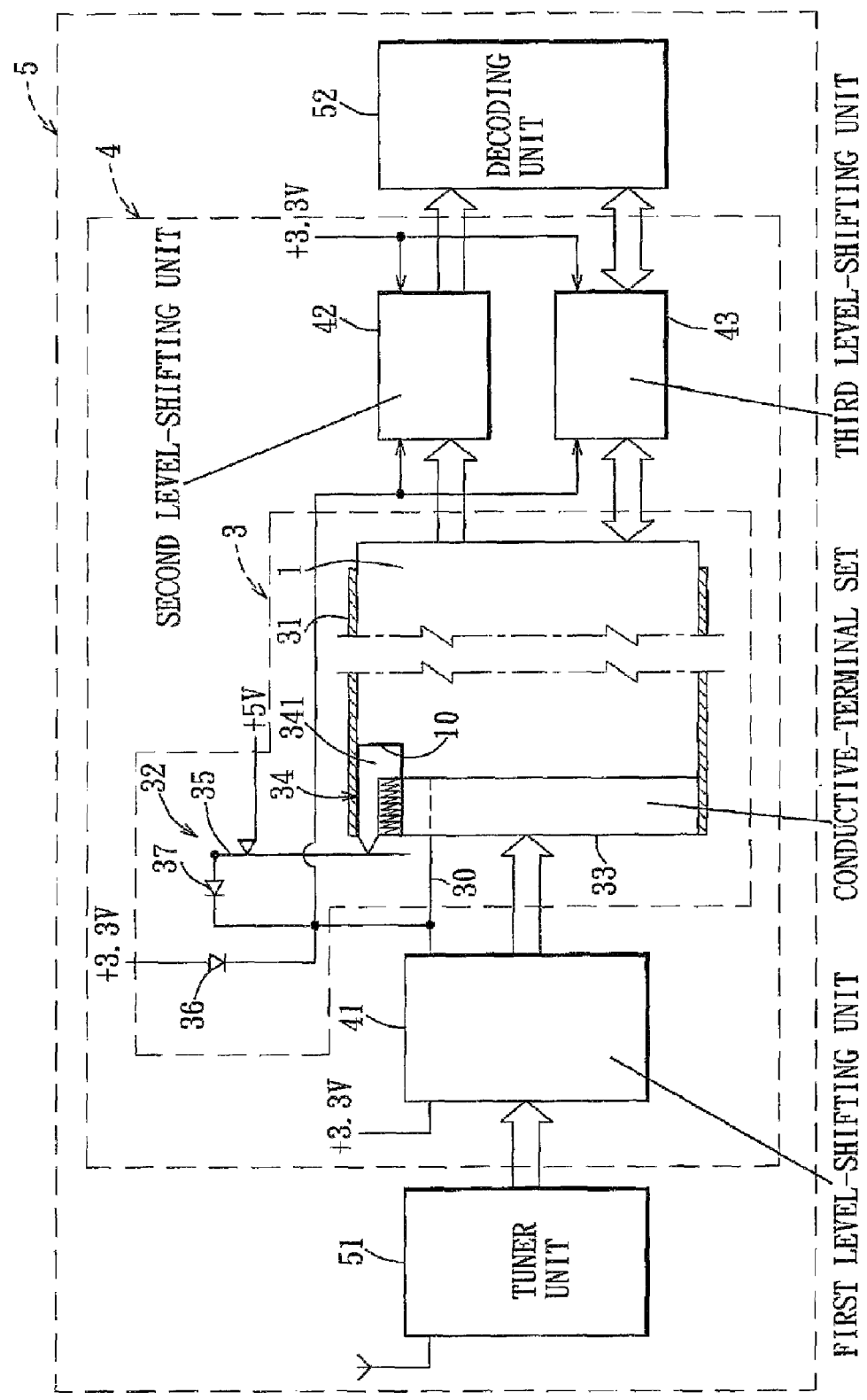
FIG. 3 is a schematic circuit diagram illustrating an embodiment of an electronic card connector, and showing a circuit condition when the CI electronic card configure to utilize the +5V power signal is inserted into the electronic card connector.
Figure 4:
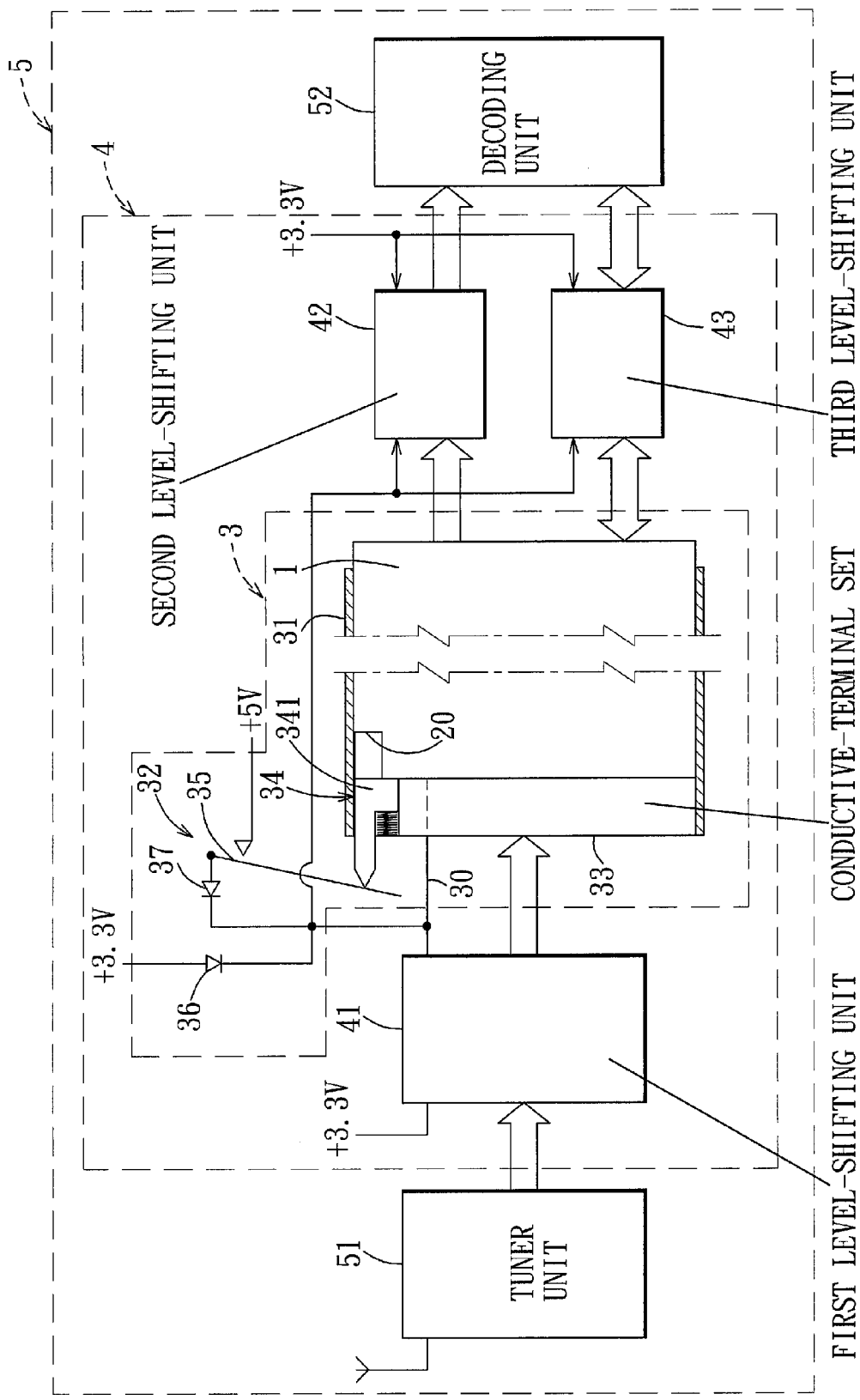
FIG. 4 shows a circuit condition of an embodiment when the CI electronic card configured to utilize the +3.3V power signal is inserted into the electronic card connector.

FIGS. 3 and 4 illustrate an embodiment of an electronic card connector 3. In this embodiment, the electronic card connector 3 is disposed in a level-shifting device 4 for insertion of common interface (CI) electronic cards 1 and 2 as shown in FIGS. 1 and 2 respectively, so that a digital television output signal inputted to the level-shifting device 4 can be decoded and a decoded digital television output signal can be subsequently provided. As shown in FIG. 3, the level-shifting device 4 can be disposed in a digital television receiver (or a set-top box) in practice, and is for receiving the digital television output signal provided by a tuner unit 51 of the digital television receiver 5, decoding the digital television output signal via the CI electronic card 1 or 2, and subsequently providing the decoded digital television output signal to a back-end decoding unit 52 of the digital television receiver 5 for a subsequent process to decompress the decoded digital television output signal.

The electronic card connector 3 of this embodiment is adapted for insertion of the CI electronic card 1 that is configured to utilize a power signal of a first power source (+5V) as shown in FIG. 1, and for insertion of the CI electronic card 2 that is configured to utilize a power signal of a second power source (+3.3V) as shown in FIG. 2. However, the tuner unit 51 and the decoding unit 52 utilize a predetermined power signal (e.g., +3.3V), so it is uncertain that the predetermined power signal matches the power signal that the CI electronic card 1 or 2 is configured to utilize. Therefore, when a signal level of a signal that the tuner unit 51 and the decoding unit 52 process does not match a signal level of a signal that the CI electronic card 1 or 2 processes, there is a need to perform a level shift in some embodiments.

Therefore, aside from the electronic card connector 3, the level-shifting device 4 of this embodiment further includes a first level-shifting unit 41 electrically connected between the tuner unit 51 and the electronic card connector 3, and a second level-shifting unit 42 and a third level-shifting unit 43 electrically connected between the electronic card connector 3 and the decoding unit 52.

The first level-shifting unit 41 is adapted for shifting a signal level of a digital television output signal transmitted from the tuner unit 51 to the CI electronic card 1 or 2 via the electronic card connector 3, such that the digital television output signal can be received and processed by the CI electronic card 1 or 2 inserted into the electronic card connector 3. The second level-shifting unit 42 is adapted for shifting a signal level of the decoded digital television output signal transmitted from the CI electronic card 1 or 2 to the decoding unit 52 via the electronic card connector 3. The third level-shifting unit 43 is adapted for shifting a signal level of a control command exchanged between the electronic card connector 3 and the decoding unit 52 so as to successfully exchange the control command between the electronic card connector 3 and the decoding unit 52.

Therefore, an input side of the first level-shifting unit 41 is adapted to utilize the predetermined power signal (+3.3V), and an output side thereof needs to selectively utilize the power signal of one of the first power source (+5V) and the second power source (+3.3V) according to the CI electronic card 1 or 2 inserted into the electronic card connector 3. Output sides of the second level-shifting unit 42 and the third level-shifting unit 43 are adapted to utilize the predetermined power signal (+3.3V), and input sides thereof need to selectively utilize the power signal of one of the first power source (+5V) and the second power source (+3.3V) according to the CI electronic card 1 or 2 inserted into the electronic card connector 3. The electronic card connector 3 of this embodiment includes an insert slot unit 31 and a switch unit 32 for achieving the aforementioned purpose.

As shown in FIGS. 3 and 4, a plurality of conductive terminals (called conductive-terminal set 33 in the following) are disposed at a side of the insert slot unit 31. The CI electronic card 1 or 2 is able to receive and transmit signals from and to the first, second and third level-shifting units 41, 42, 43 via electrical connections between the conductive-terminal set 33 and the first, second and third level-shifting units 41, 42, 43. Additionally, the insert slot unit 31 is further provided with a power signal terminal 30 for providing electric power to the CI electronic card 1 or 2, and the first, second and third level-shifting units 41, 42, 43.

The switch unit 32 includes a pushing component 34, a spring member 35 adapted to contact separably the first power source (+5V) and having one end pushed by the pushing component 34, a first diode 36 adapted to connect the second power source (+3.3V) with the power signal terminal 30 in a forward bias condition, and a second diode 37 connecting the spring member 35 with the power signal terminal 30 in the forward bias condition.

The pushing component 34 is disposed in the insert slot unit 31 adjacent to the conductive-terminal set 33. The pushing component 34 can be pushed so as to move in the insert slot unit 31 toward the spring member 35, and can be restored to an initial position via an elastic component. The pushing component 34 is formed with a block 341 that is disposed at an end thereof facing an entrance of the insert slot unit 31, and that matches a fool-proof notch 10 configured at the front end of the CI electronic card 1. Moreover, the length at a side of the block 341 facing the entrance of the insert slot unit 31 is longer than the length at a corresponding side of the fool-proof notch 20 of the CI electronic card 2. Moreover, the other end of the pushing component 34 projects outwardly from the insert slot unit 31 for pushing the spring member 35. Further, when the spring member 35 is not pushed by the pushing component 34, the spring member 35 normally contacts the first power source (+5V), and the power signal of the first power source (+5V) is provided to the power signal terminal 30 through the spring member 35 and the second diode 37. When the spring member 35 is pushed by the pushing component 34, the spring member 35 is separated from the first power source (+5V), and consequently the power signal of the second power source (+3.3V) is provided to the power signal terminal 30 through the first diode 36. It should be noted that FIGS. 3 and 4 illustrate a cooperative relationship between the fool-proof notch 10 or 20 of the corresponding CI electronic card 1 or 2, and the block 341 via schematic diagrams to facilitate illustration. Actual positions and configurations of the fool-proof notches 10, 20 are shown in FIGS. 1 and 2, respectively.

As shown in FIG. 3, when the CI electronic card 1 is inserted into the insert slot unit 31, it will not push the pushing component 34 due to the fool-proof notch 10 matching the block 341 of the pushing component 34. Therefore, the spring member 35 electrically contacts the first power source (+5V) so as to provide the power signal of the first power source (+5V) to the power signal terminal 30 and the first, second and third level-shifting units 41, 42, 43 connecting with the power signal terminal 30 through the spring member 35 and the second diode 37. At this time, a voltage (+5V) at a cathode of the first diode 36 is larger than a voltage (+3.3V) at an anode thereof. Therefore, the first diode 36 is in a reverse bias condition so as to prevent the power signal of the first power source (+3.3V) flowing to the power signal terminal 30.

Therefore, the first level-shifting unit 41 is operable for shifting the signal level of the digital television output signal transmitted from the tuner unit 51 from +3.3V to +5V, and subsequently for providing a level-shifted output to the CI electronic card 1 via the electronic card connector 3. Additionally, the second level-shifting unit 42 is operable for shifting the signal level of the decoded digital television output signal provided by the CI electronic card 1 from +5V to +3.3V, and subsequently for providing a level-shifted output to the back-end decoding unit 52. The third level-shifting unit 43 is operable for shifting the signal level of the control command exchanged between the CI electronic card 1 and the decoding unit 52, and subsequently for providing a level-shifted output to a destined one of the electronic card 1 and the decoding unit 52 via the electronic card connector 3.

Additionally, as shown in FIG. 4, when using the CI electronic card 2, because the fool-proof notch 20 does not match the block 341 of the pushing component 34, the pushing component 34 will be pushed by the front end of the CI electronic card 2 when the CI electronic card 2 is inserted into the insert slot unit 31 and moves toward the conductive-terminal set 33. Therefore, one end of the pushing component 34 projects outwardly from the insert slot unit 31 for pushing the spring member 35 so as to separate the spring member 35 from the first power source (+5V). Therefore, when the CI electronic card 2 has been inserted into the insert slot unit 31 completely and has established connection with the conductive-terminal set 33, the first diode 36 is in a forward bias condition so as to permit the power signal terminal 30 and the first, second and third level-shifting units 41, 42, 43 connected thereto to receive the power signal of the second power source (+3.3V).

Because a signal level of the power signal that the CI electronic card 2 utilizes is the same as the signal levels of the power signals that the tuner unit 51 and the decoding unit 52 utilize, signals are transmitted through the first, second and third level-shifting units 41, 42, 43 without performing the level shift.

It should be noted that the aforementioned configuration that utilizes the pushing component 34 to control the spring member 35 to electrically contact or separate from the first power source can be modified using a conventional normal-closed (NC) micro switch (not shown). That is, in some embodiments, when the pushing component 34 does not trigger the NC micro switch, the NC micro switch is normally closed and establishes an electrical connection between the first power source (+5V) and the power signal terminal 30. On the other hand, when the pushing component 34 triggers the NC micro switch, the NC micro switch separates the power signal terminal 30 from the first power source (+5V).

Figure 5:
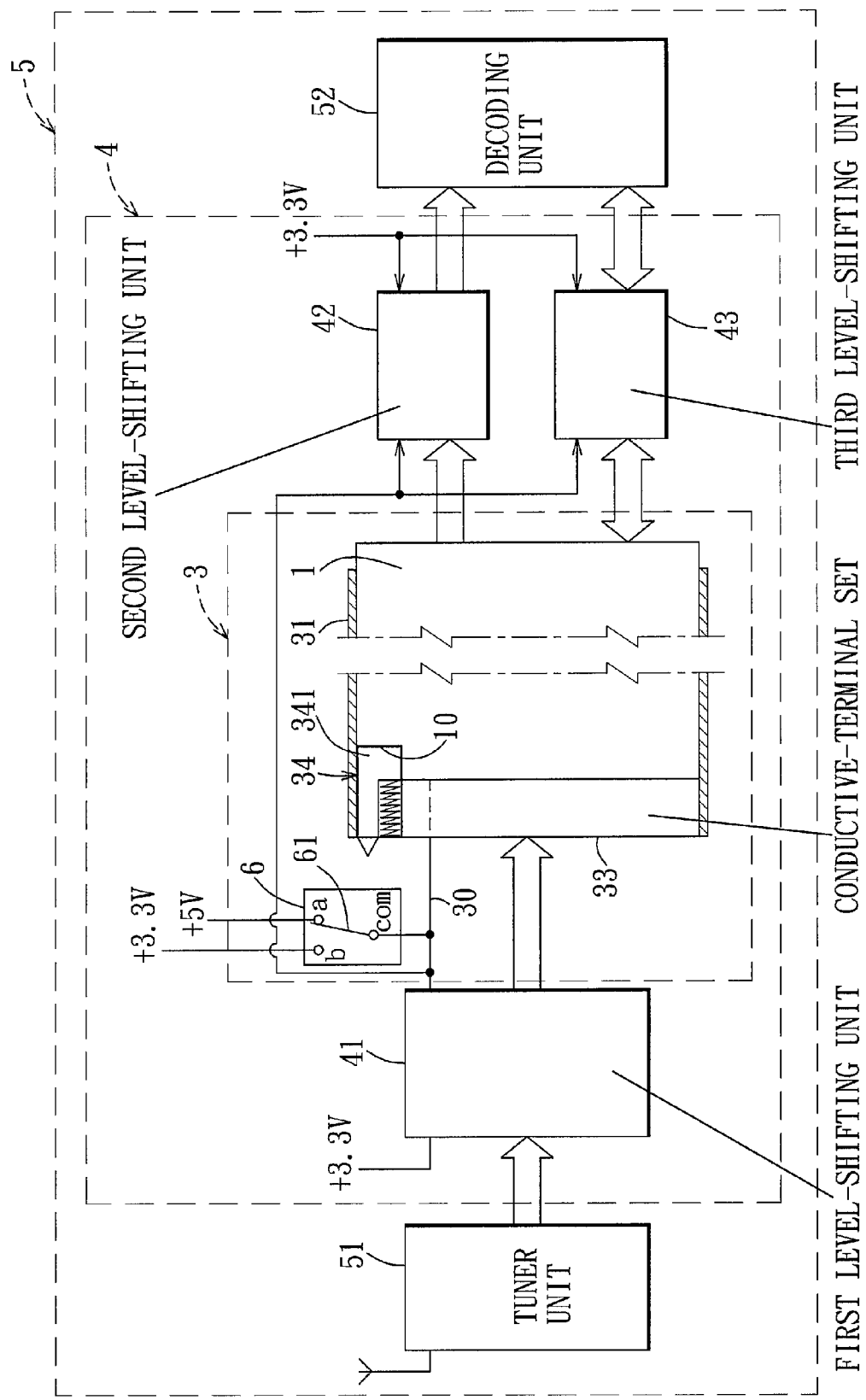
FIG. 5 shows an embodiment of a modified switch unit.

Additionally, as shown in FIG. 5, the switch unit 32 of this embodiment can be also realized using the pushing component 34 cooperating with a switch component, such as a micro switch 6. The micro switch 6 includes a common terminal (COM), an (a) node, a (b) node, and a switching blade 61. The (COM) terminal is electrically connected to the power signal terminal 30; the (a) node is electrically connected to the first power source (+5V); and the (b) node is electrically connected to the second power source (+3.3V). Moreover, one end of the switching blade 61 is electrically connected to the (COM) terminal, and the other end is electrically connected to the (a) node normally. When the pushing component 34 triggers the micro switch 6, the other end of the switch plate 61 that is electrically connected to the (a) node normally moves so as to be electrically connected to the (b) node, such that a purpose of switching between the first and second power sources is achieved.

In sum, the pushing component 34 of the switch unit 32 is used in this embodiment to detect the fool-proof notch of the CI electronic card inserted into the insert slot unit 31 so that the appropriate power signal that corresponds to the CI electronic card can be provided to the CI electronic card and to the first, second and third level-shifting units 41, 42, 43. Therefore, a purpose of enable use of different CI electronic cards with the same digital television receiver 5 can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A level-shifting device adapted to electrically interconnect a tuner unit and a decoding unit of a digital television receiver, said level-shifting device comprising:
   an electronic card connector adapted to be electrically connected to a first power source and a second power source, adapted for insertion of an electronic card, and operable to provide a power signal of one of the first and second power sources to the electronic card according to a requirement of the electronic card;
   a first level-shifting unit adapted to be electrically connected between the tuner unit and said electronic card connector, adapted to receive a predetermined power signal, and operable for shifting a signal level of a digital television output signal of the tuner unit and for providing a level-shifted output to the electronic card via said electronic card connector when the power signal provided by said electronic card connector to the electronic card inserted therein does not match the predetermined power signal;
   a second level-shifting unit adapted to be electrically connected between the decoding unit and said electronic card connector, adapted to receive the predetermined power signal, and operable for shifting a signal level of a digital television output signal of the electronic card from said electronic card connector and for providing a level-shifted output to the decoding unit when the power signal provided by said electronic card connector to the electronic card inserted therein does not match the predetermined power signal; and
   a third level-shifting unit adapted to be electrically connected between the decoding unit and said electronic card connector, adapted to receive the predetermined power signal, and operable for shifting a signal level of a control command exchanged between the electronic card and the decoding unit via said electronic card connector and said third level-shifting unit and for providing a level-shifted output to a destined one of the electronic card and the decoding unit via said electronic card connector when the power signal provided by said electronic card connector to the electronic card inserted therein does not match the predetermined power signal.

2. The level-shifting device as claimed in claim 1, wherein said electronic card connector includes:
   an insert slot unit adapted for insertion of the electronic card and provided with a power signal terminal for providing electric power to the electronic card that is inserted into said insert slot unit; and
   a switch unit disposed in said insert slot unit and adapted to be electrically connected to the first and second power sources, said switch unit being operable to establish electrical connection between said power signal terminal and the first power source when the electronic card inserted into said insert slot unit does not actuate said switch unit, said switch unit being further operable to establish electrical connection between said power signal terminal and the second power source when the electronic card inserted into said insert slot unit actuates said switch unit.

3. The level-shifting device as claimed in claim 2, wherein said switch unit is not actuated when the electronic card inserted into said insert slot unit is one that is configured to utilize the power signal of the first power source, and said switch unit is actuated when the electronic card inserted into said insert slot unit is one that is configured to utilize the power signal of the second power source.

4. The level-shifting device as claimed in claim 2, wherein said switch unit includes:
   a pushing component movably disposed in said insert slot unit;
   a spring member adapted to contact separably the first power source and having one end pushed by said pushing component;
   a first diode adapted to connect the second power source with said power signal terminal in a forward bias condition; and
   a second diode connecting said spring member with said power signal terminal in the forward bias condition;
   wherein said spring member electrically contacts the first power source so as to provide the power signal of the first power source to said power signal terminal through said second diode when the electronic card inserted into said insert slot unit does not cause said pushing component to move in said insert slot unit; and
   wherein said spring member is pushed by said pushing component to separate from the first power source so as to permit said power signal terminal to receive the power signal of the second power source through said first diode when the electronic card inserted into said insert slot unit causes said pushing component to move in said insert slot unit.

5. The level-shifting device as claimed in claim 4, wherein:
   when the electronic card is one that is configured to utilize the power signal of the first power source, said pushing component matches a fool-proof notch provided in the electronic card, such that the electronic card does not cause said pushing component to move in said insert slot unit when the electronic card is inserted into said insert slot unit; and when the electronic card is one that is configured to utilize the power signal of the second power source, said pushing component does not match a fool-proof notch provided in the electronic card, such that the electronic card causes said pushing component to move in said insert slot unit when the electronic card is inserted into said insert slot unit.

6. The level-shifting device as claimed in claim 2, wherein said switch unit includes:

a pushing component movably disposed in said insert slot unit; and a switch component electrically connected to said power signal terminal, and adapted to be electrically connected to the first and second power sources;

wherein said switch component establishes the electrical connection between said power signal terminal and the first power source when the electronic card inserted into said insert slot unit does not cause said pushing component to move in said insert slot unit, and is triggered by said pushing component to establish the electrical connection between said power signal terminal and the second power source when the electronic card inserted into said insert slot unit causes said pushing component to move in said insert slot unit.

7. The level-shifting device as claimed in claim 6, wherein:

when the electronic card is one that is configured to utilize the power signal of the first power source, said pushing component matches a fool-proof notch provided in the electronic card, such that the electronic card does not cause said pushing component to move in said insert slot unit when the electronic card is inserted into said insert slot unit; and when the electronic card is one that is configured to utilize the power signal of the second power source, said pushing component does not match a fool-proof notch provided in the electronic card, such that the electronic card causes said pushing component to move in said insert slot unit when the electronic card is inserted into said insert slot unit.

* * * * *